March 29, 1949. J. G. OETZEL 2,465,394
BRAKE MECHANISM
Filed Dec. 29, 1944 4 Sheets-Sheet 1

INVENTOR
John George Oetzel
By Carlson, Pitzner, Hubbard & Wolfe
ATTORNEYS

March 29, 1949.  J. G. OETZEL  2,465,394
BRAKE MECHANISM
Filed Dec. 29, 1944  4 Sheets-Sheet 3

INVENTOR
John George Oetzel
By Carlson, Pitzner, Hubbard & Wolfe
ATTORNEYS

March 29, 1949. J. G. OETZEL 2,465,394
BRAKE MECHANISM

Filed Dec. 29, 1944 4 Sheets-Sheet 4

INVENTOR
John George Oetzel
ATTORNEYS

Patented Mar. 29, 1949

2,465,394

UNITED STATES PATENT OFFICE 2,465,394

BRAKE MECHANISM

John George Oetzel, Beloit, Wis., assignor to Warner Electric Brake Manufacturing Company, South Beloit, Ill., a corporation of Illinois Application December 29, 1944, Serial No. 570,277

4 Claims. (Cl. 188—138)

This invention relates generally to friction brake mechanisms of the character used on vehicle wheels and in certain aspects has more particular reference to brakes of the compound type wherein an auxiliary expandable friction element derives an actuating force to expand a main friction element.

One object of the invention is to provide a novel arrangement of the main and auxiliary friction elements to provide a powerful braking torque and extreme axial compactness in a brake mechanism of the above character.

Another object is to provide a novel anchor construction.

Figure 1:
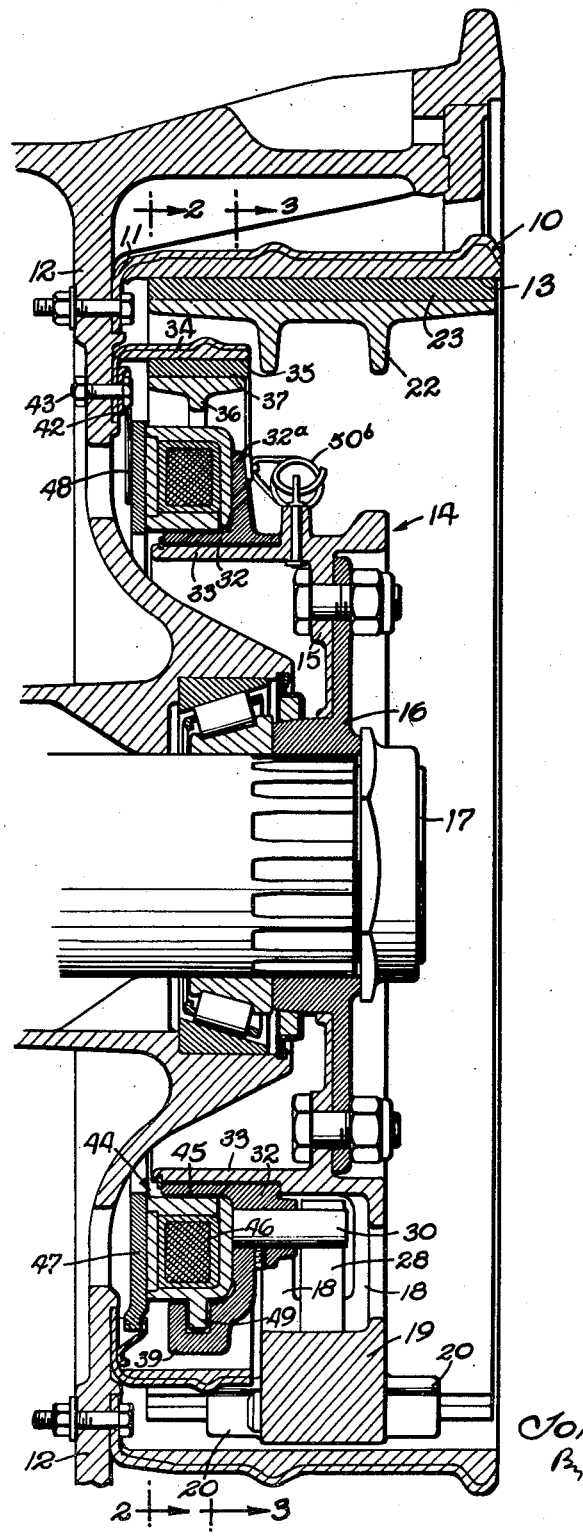
Figure 3:
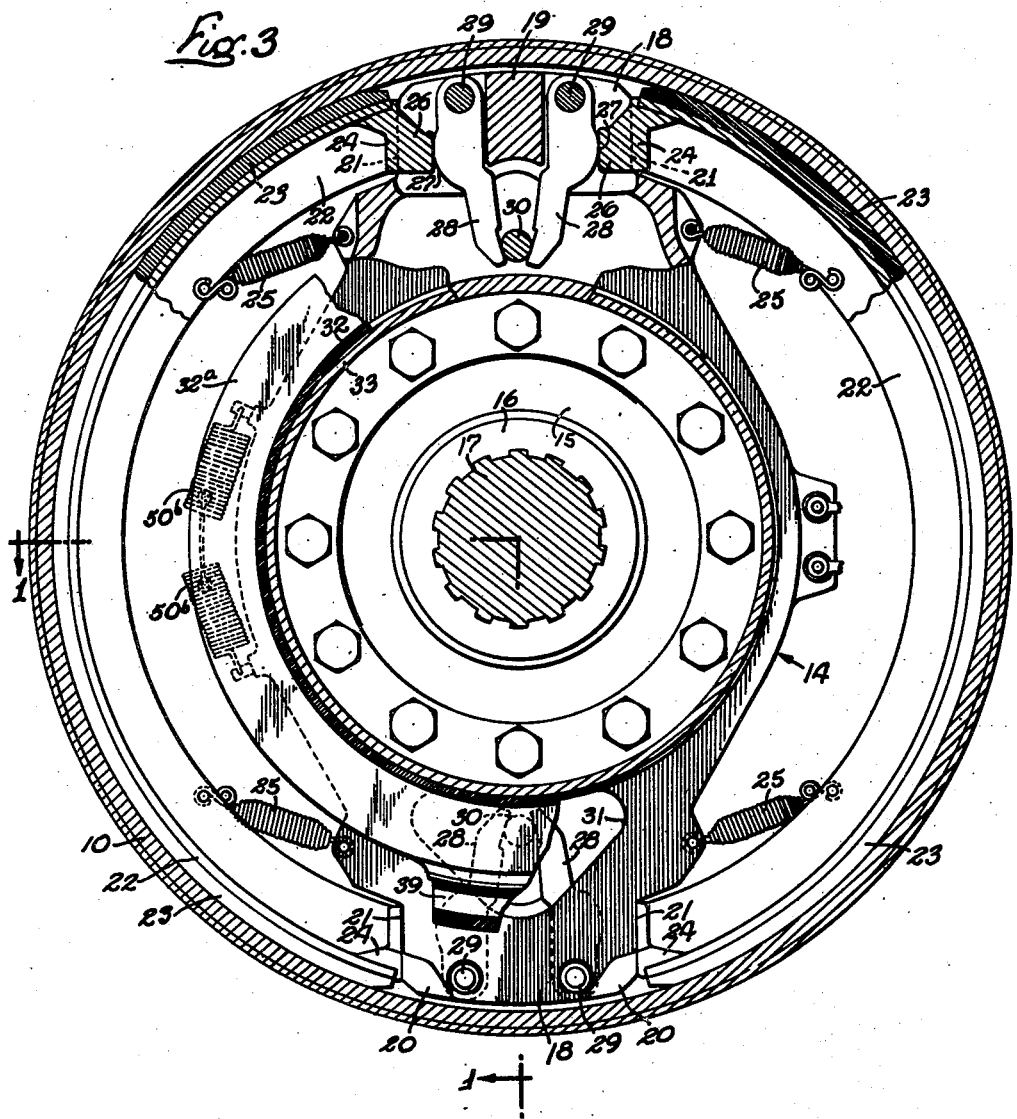

Other objects and advantages of the invention will become apparent from the following detailed description taken in connection with the accompanying drawings, in which Figure 1 is a diametrical sectional view of a brake embodying the novel features of the present invention, the section being taken along the line 1—1 of Fig. 3.

Figure 2:
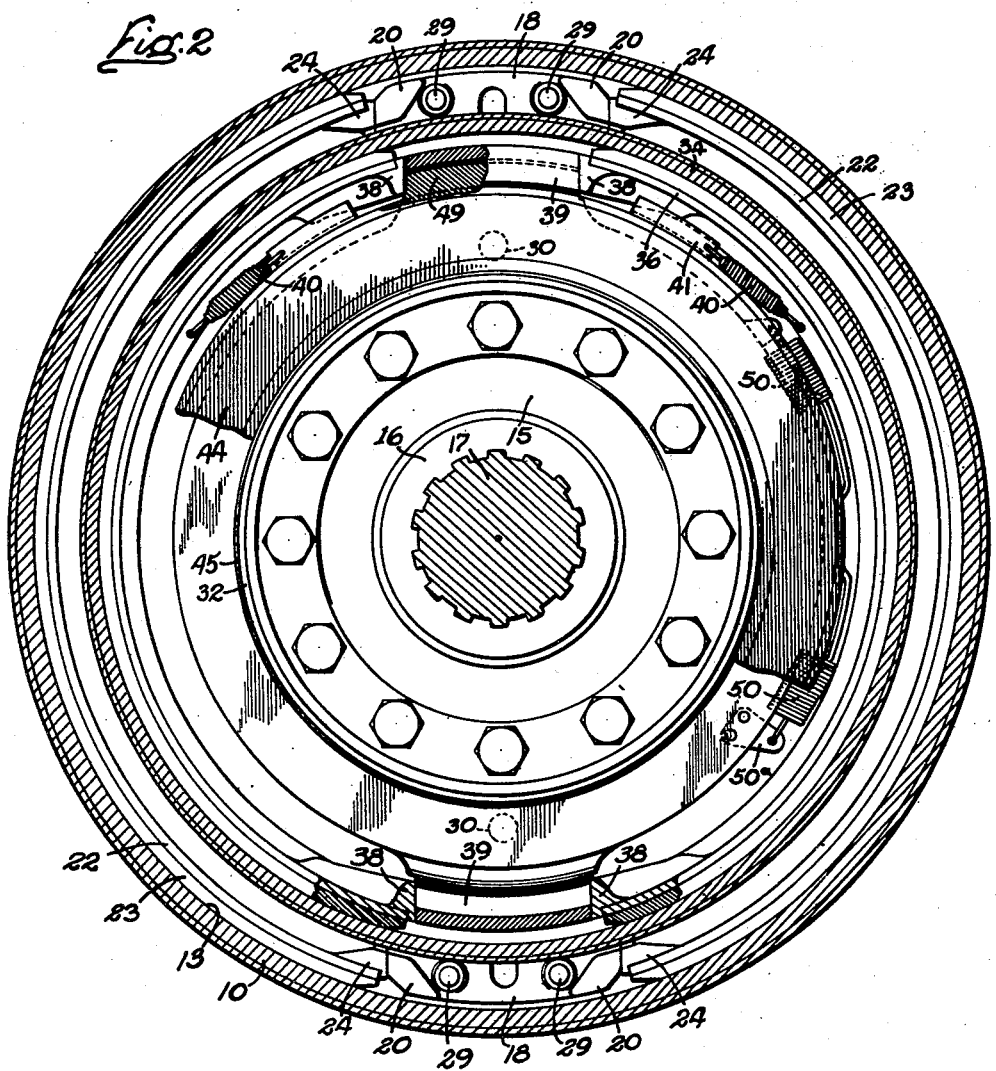

Figs. 2 and 3 are sections taken respectively along the lines 2—2 and 3—3 of Fig. 1.

Figure 4:
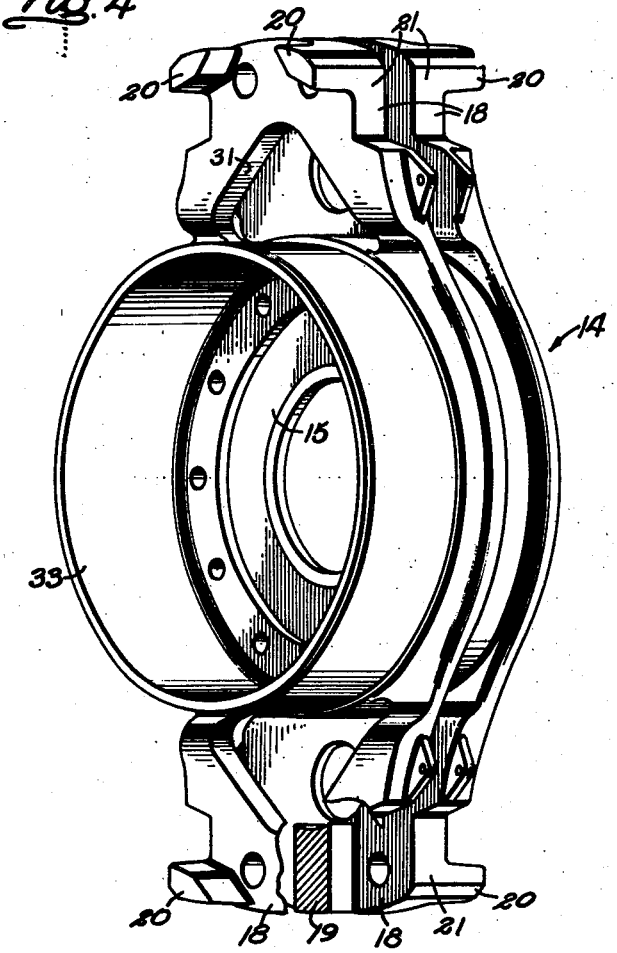

Fig. 4 is a perspective view of the main anchor member.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

The brake mechanism shown for purposes of illustration is of the internal expanding type adapted for use with a drum 10 having an inturned flange 11 bolted to the vehicle wheel 12 or other part to be braked and having an internal cylindrical surface 13 adapted to be gripped by the main or non-rotatable friction element of the brake mechanism. The latter is supported by an anchor member indicated generally at 14 and comprising a casting (Fig. 4) having an inner peripheral flange 15 bolted to a collar 16 which is splined onto the wheel axle 17 with the flange 15 axially located centrally of the drum. Projecting outwardly from diametrically opposite sides of the flange 15 are two pairs of generally flat arms 18 axially spaced apart and integrally connected by a web 19 at their outer ends which are disposed close to the drum surface 13. Pairs of lugs 20 project from opposite sides of the arms 18 and cooperate with the edge surfaces 21 to form flat abutment anchors for the ends of the main friction element.

Herein, this main element comprises two semicircular shoes 22 either flexible or rigid and arranged in end to end relation and having segments 23 of suitable friction material secured to their outer surfaces. Brackets 24 at opposite ends of each shoe and on both sides of each shoe end bear against the abutment surfaces 21 and the lugs 20 and are normally held against the latter by return springs 25. The shoes are centered with respect to the anchor and drum surface by lugs 26 projecting from the center of each shoe end into the space between the anchor arms 18.

The friction element is expanded to apply the brake by movement of the corresponding ends of each shoe 22. This is accomplished by cam surfaces 27 bearing against the ends of the shoe lugs 26 and formed intermediate the ends of crank arms 28 which project inwardly from their supporting pivot pins 29. There is a crank for each shoe end and the cranks for each pair are disposed between the anchor arms 18 on opposite sides of the connecting web 19 which limits the swing of each crank toward the adjacent crank.

Actuation of two of the cranks 28 to move the corresponding shoe ends away from released position and against their anchors at the opposite shoe ends is effected by pins 30 projecting parallel to the drum axis in between the inner ends of the cranks 28 of the respective pairs. The pins project through triangular holes 31 in the anchor arms and the other ends of the pins are anchored in an auxiliary anchor member in the form of a ring 32 which lies alongside the cranks 28 and extends around the cylindrical hub 33 on which the ring is journaled for oscillation about the drum axis. This hub is integral with the main anchor 14 and projects toward the vehicle wheel 12 into an auxiliary drum 34 concentric with the main drum 10 but also terminating short of the cranks 28 which are on the center line of the main friction element. The auxiliary drum has an inturned flange 42 secured to the wheel 12 by bolts 43.

The internal cylindrical surface 35 of this drum cooperates with an auxiliary friction element comprising two shoes 36 having friction coverings 37 and arranged end-to-end with the adjacent ends 38 of the different shoes abutting against anchors 39. The latter comprise outwardly projecting arms of J-shaped cross-section (see Fig. 1) integral with the auxiliary anchor.

Expansion of the auxiliary friction shoes 36 is effected in the present instance by a momentum operator whose parts are concentric with the anchor ring 32 and the auxiliary drum 34. The operator includes an annular magnet ring 44 mounted to oscillate on a cylindrical surface 45 of the auxiliary anchor ring and back by an outwardly projecting flange 32ª thereon. The magnet is of U-shaped cross-section having concentric poles enclosing a winding 46 and terminating in end faces spanned by an armature ring 47. The latter is supported by tangentially extending leaf springs 48 fastened to the wheel 12 by the bolts 43, the springs also serving to maintain continuous mechanical contact between the armature and the face of the magnet. Lugs 49 project rigidly from the outer magnet pole into the space between the spaced parts of the anchor arms 39 and are of the same circumferential length as these arms. The lugs are thus positioned for engagement with the ends 38 of the auxiliary shoes 36 and are operable to move one or the other ends of these shoes away from their anchors 39 when the magnet is turned in either direction.

Return of the magnet 44, the actuated ends of the auxiliary shoes 36 and the auxiliary anchor ring 32 to normal brake-released position is effected by springs 40 stretched between the shoes 36 and brackets 41 on the magnet, springs 50 stretched between the magnet and eyes 50ª on the anchor ring 32, and springs 50ᵇ (Figs. 1 and 3) acting between the ring 32 and the main anchor 14.

When the magnet 44 is deenergized, the parts are disposed in the positions shown in the drawings, the brake then being released. Energization of the magnet winding produces proportional gripping engagement between the rotating armature 47 and the friction face of the magnet causing the latter to turn with the wheel. This movement is communicated through the actuating lugs 49 to the corresponding ends 38 of the auxiliary shoes 36 which are thereby expanded against the drum 34. The resulting friction force applied to these shoes urges them and their floating anchor ring 32 in the direction of drum rotation thereby moving the actuating pins 30 to swing two of the cranks 38 and thereby move the corresponding ends of the main brake shoes 22 away from their anchors.

After these shoes engage the surface 13 of the main drum, slippage occurs between all of the coacting friction surfaces and a powerful retarding torque is exerted on the wheel. This torque is the result of self-energizing forces produced by the magnet and armature, then amplified by the auxiliary friction element, and finally applied to the main friction element. By augmenting the initial actuating force in this way, the desired resultant retarding torque is obtained without sacrificing controllability in accordance with the energization of the magnet winding. When the latter is deenergized, the parts are returned quickly to their brake-released positions by the action of the springs 25, 40, 50, and 50ᵇ.

It will be observed that all of the parts of the main, auxiliary and magnetic operators are compactly arranged within a comparatively narrow annular space between the drum 10 and the hub 33. Also, by disposing the auxiliary brake mechanism, which may be made of relatively short axial length, within the main brake and to one side of the center of the latter, the over all axial length of the compound brake is reduced to a minimum. This arrangement also permits the use of relatively long crank arms 28 and their location on the center lines of the main brake shoes.

I claim as my invention:

1. A brake mechanism having, in combination, a main anchor member having an axially projecting hub and a plurality of angularly projecting stops disposed outwardly beyond said hub and each having circumferentially spaced abutment surfaces facing circumferentially in opposite directions, an annular friction element having a plurality of parts with their ends abutting said surfaces and separable therefrom to expand the element, crank means mounted on said stops to swing in the plane of the center line of said element and projecting inwardly to a position adjacent said hub and engageable with said element ends, a second anchor member journaled on said hub externally thereof and pivotally connected to the inner ends of said crank means whereby to move the corresponding element ends away from their stops and expand the element when the auxiliary anchor is turned in either direction away from a normal brake-released position, a second annular friction element of smaller radius than and less than half the width of said first element supported by said second member between said first element and said hub and disposed between said plane of the center line of said first element but axially offset from the latter so as to lie alongside said crank means, said second element having circumferentially separable ends adapted for abutting engagement with stop surfaces on said second member, a ring smaller than said second element and journaled on said second anchor member in the plane of the second element to turn about the axis of said hub, and means connecting said ring and the ends of said second element and operable selectively to move either one or the other of such ends away from its stop and thereby expand the element upon turning of the ring in either direction away from brake-released position, said second friction element, when expanded into engagement with a rotating drum surface, causing angular movement of said second anchor member and actuation of said crank means thereby.

2. A brake mechanism having, in combination, a main anchor member having an axially projecting hub and a stop disposed outwardly beyond said hub and having circumferentially spaced abutment surfaces facing circumferentially in opposite directions, an annular friction element having ends abutting said surfaces and separable therefrom to expand the element, inwardly projecting crank means mounted on said anchor member to swing in the plane of the center line of said element and engageable selectively with either one or the other of said element ends to move such end away from its abutment surface, a second anchor member journaled on said hub externally thereof and pivotally connected to the inner end of said crank means whereby to move the corresponding element ends away from anchors and expand the element when the auxiliary anchor is turned in either direction away from a normal brake-released position, a second friction element substantially narrower and of smaller radius than said first element supported by said second member between said first element and said hub and disposed between said plane of the center line of said first element but axially offset from the latter so as to lie alongside said crank means, said second element having circumferentially separable ends anchored on said second member, and actuating means movably mounted on said second anchor member to turn about the axis of said hub in either direction away from a normal brake-released position and operable in such movement to move one or the other of the ends of said second element away from its anchor and expand the latter, said second friction element, when expanded into engagement with a rotating drum surface, causing angular movement of said second anchor member and actuation of said crank means thereby.

3. A brake mechanism having, in combination, inner and outer annular radially expansible friction elements having cylindrical peripheral surfaces concentric with each other, the inner element being narrower than the outer element and offset axially from the center line of the latter element, a non-rotatable anchor for the outer element, an anchor for the inner element movable about the axis of the elements, means for expanding said inner element, and operating means connecting said movable anchor and said outer element and operable to expand the latter upon turning of the anchor in either direction away from a normal brake-released position, said inner friction element, when expanded into gripping engagement with a rotating drum surface causing angular movement of said inner element anchor and actuation of said operating means thereby, and said operating means being disposed alongside said inner element and having all of its parts movable in the central plane of said outer element.

4. A brake mechanism having, in combination, inner and outer annular radially expansible friction elements having cylindrical peripheral surfaces concentric with each other, the inner element being narrower than the outer element and offset axially from the center line of the latter element, a non-rotatable anchor for the outer element, an anchor for the inner element movable about the axis of the elements, means for expanding said inner element, operating means connecting said movable anchor and said outer element and operable to expand the latter upon turning of the anchor in either direction away from a normal brake-released position, said operating means being disposed alongside said inner element and having all of its parts movable in the central plane of said outer element, a ring mounted to oscillate about said axis and disposed in the plane of the center line of said inner element, and means connecting said inner element and said ring for expanding the latter upon turning of the ring in either direction from a normal brake-released position, all of the parts of said last mentioned connecting means lying in the plane of the center line of said inner element, said inner friction element, when expanded into gripping engagement with a rotating drum surface causing angular movement of said inner element anchor and actuation of said operating means thereby.

JOHN GEORGE OETZEL.

REFERENCES CITED

The following references are of record in the file of this patent:

UNITED STATES PATENTS

| Number | Name | Date |
|---|---|---|
| 1,564,515 | Bower | Dec. 8, 1925 |
| 1,726,517 | Reynolds | Aug. 27, 1929 |
| 1,925,897 | Fawick | Sept. 5, 1933 |
| 2,265,999 | Cadman | Dec. 16, 1941 |
| 2,352,218 | Oetzel | June 27, 1944 |

FOREIGN PATENTS

| Number | Country | Date |
|---|---|---|
| 755,456 | France | Sept. 11, 1933 |
| 785,034 | France | May 13, 1935 |